Figure 4:
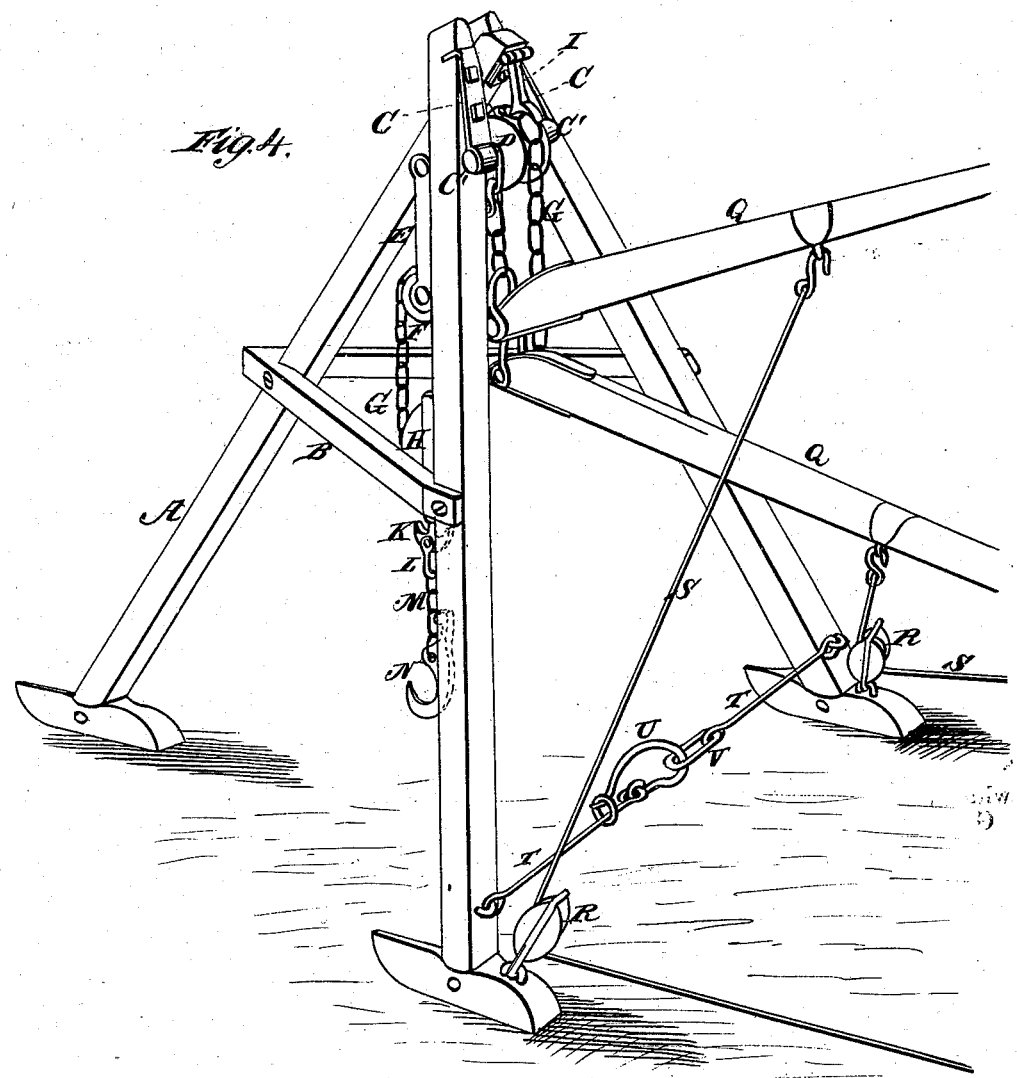

J. G. TRUMP.
Stump-Puller.
No. 224,746. Patented Feb. 17, 1880.
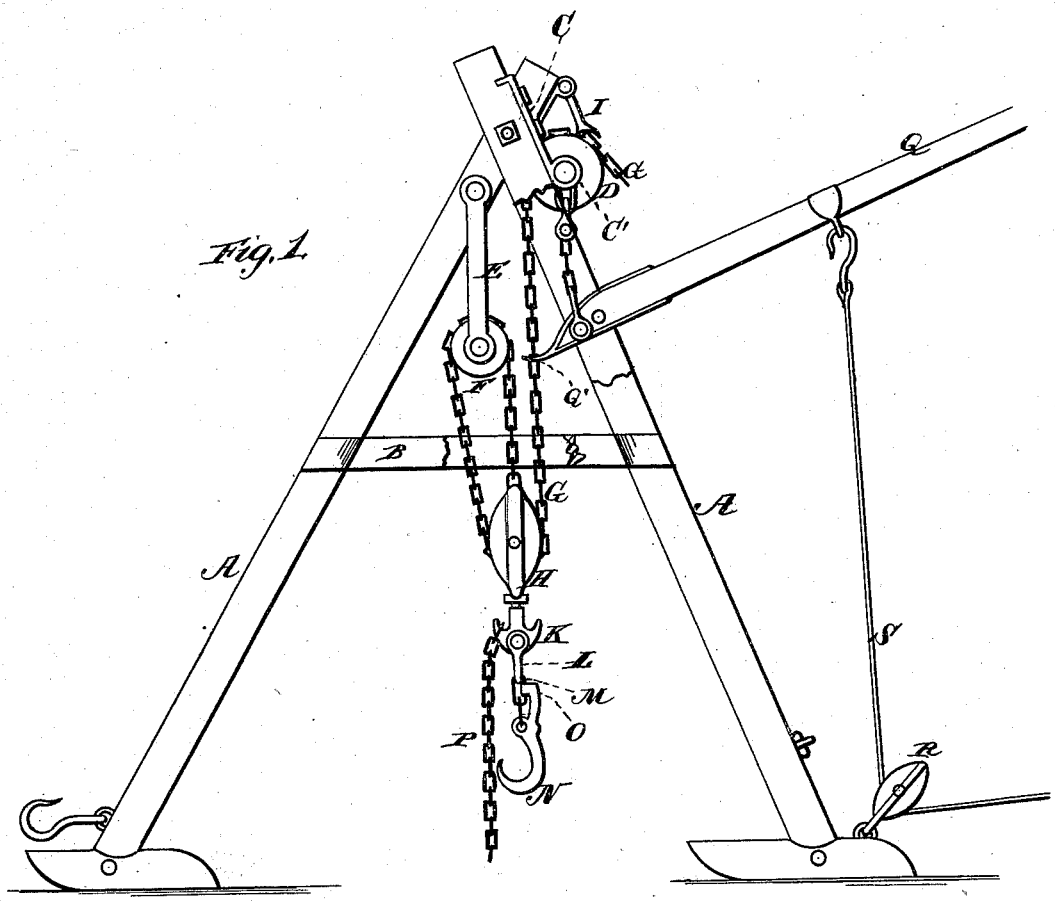
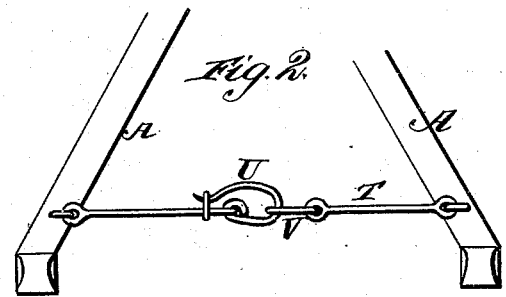
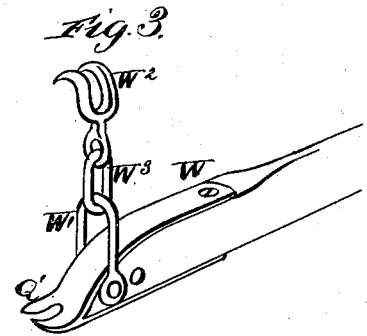
WITNESSES
INVENTOR
John G. Trump
Gilmore, Smith & Co.
ATTORNEYS 2 Sheets—Sheet 2.

J. G. TRUMP.
Stump-Puller.

No. 224,746. Patented Feb. 17, 1880.

WITNESSES
Robert Everett
John Shain

INVENTOR
John G. Trump.
Gilmore Smith & Co.
ATTORNEYS

UNITED STATES PATENT OFFICE.

JOHN G. TRUMP, OF VASSAR, MICHIGAN.

STUMP-PULLER.

SPECIFICATION forming part of Letters Patent No. 224,746, dated February 17, 1880.

Application filed January 3, 1880.

*To all whom it may concern:*

Be it known that I, JOHN G. TRUMP, of Vassar, in the county of Tuscola and State of Michigan, have invented certain new and useful Improvements in Stump-Pullers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side elevation of my stump-puller. Figs. 2 and 3 are detail views of the same. Fig. 4 is a perspective view of the stump-puller.

The nature of my invention relates to stump-pulling apparatus; and it consists in the construction and arrangement of parts, as fully set forth in the following description, and particularly pointed out in the claims.

In the drawings, A refers to the inclined timbers, and B the horizontal brace-bars, of a pyramidal frame which supports the apparatus for uprooting stumps from the ground. C C designate two strong metal straps, which have bearings C' at their lower ends for the axis of a pulley, D, and which are bolted to two of the timbers A. E designates a hanger, which is pivoted to the remaining timber A, and which carries a pulley-wheel, F. The chain G passes around the pulley D, thence down and through the pulley-block H, after which it passes upward over the pulley F, after which it extends downward to and is secured to the pulley-block H. I designates a dog or pawl, which is pivoted at the apex of the pyramidal frame, so as to engage with the links of the chain over the pulley D. K designates a double-barbed or anchor-shaped hook, which is swiveled at the lower end of the block H. A clevis, L, is pivoted to this hook at a point intermediate of its barbs, and to this clevis is linked a short chain, M. At the lower extremity of this chain is a hook, N, the shank portion of which is formed with flanges or clasps O, which embrace a portion of one of the links when the shank of the hook is brought into a vertical line. The hook may, however, be turned upon the link with which it is connected so as to disengage the clasps from the chain. This may sometimes be found desirable in grappling with stumps or roots.

P designates a short chain, designed to be passed around a root or stump. If desired, the ends of this chain may be connected with the hook N or with the upper double hook, K, according to circumstances.

Q are lever-bars, suspended by chains from the axis of the pulley D. These bars have prongs Q', so that the operators may engage the prongs with the links of the chain, and then, by bearing down upon the long arm of the lever, raise the chain and pulley-block. The chain will have sufficient rigidity to force its way over the upper pulley and under the pawl, the latter preventing its return by reason of its engagement with the links.

R refers to pulley-blocks at the base of the frame, and S ropes connected with the lever-bars and passing through said pulley-blocks, so that the ends of the ropes may be grasped by the operators, and thereby additional means provided for bearing down the lever-bars.

T refers to brace-rods, one of which has a hook, U, and the other a link, V. These rods are connected with the frame near its base.

W refers to an auxiliary lever-bar provided with a forked end similarly to the lever-bar previously described, and for the purpose of engaging the links of the lifting-chain in a like manner. This lever-bar is, however, to be used only when greater power is necessary than can be attained by the apparatus just described, and may be connected with or disconnected from such apparatus at pleasure. To this end such lever has a pivoted clevis, W', a claw-shaped hook, W², and a link, W³, connecting such hook with the clevis. In use this claw-hook is engaged with one of the chains which support the lever-bars Q, so that bearings for such lever will be had. Two of these bars W may be employed.

In operation the chain will be secured around the stump or roots, and the block then raised by operating the lever-bars in the manner hereinbefore set forth.

Having described my invention, what I claim is—

1. In a stump-extractor, the herein-described chain, pulley-wheels, and pawl arranged to take into the chain, in combination with lever-bars provided with forked ends adapted to engage with the chain for the purpose of raising the same, substantially as set forth.

2. The pyramidal frame, essentially composed of the inclined timbers A, the strap C, with bearings C', the pulley-wheel D, hanger E, pulley-wheel F, chain G, pulley-block H, pawl I, and hook at the lower extremity of the chain G, all constructed and arranged substantially as herein shown and set forth.

3. In a stump-extractor, the chain G and double hook K, swiveled to the pulley-block, substantially as set forth.

4. In a stump-extractor, the chain G, double hook K, swiveled to the pulley-block, clevis L, pivoted to the hook K, the short chain M, linked to the clevis, and the hook N, connected with the short chain M, substantially as specified.

5. In a stump-extractor, the hook N, connected to the chain M, and having its shank formed with clasps O, substantially as set forth.

6. In a stump-extractor, the lever-bars Q, suspended from the axis of the pulley D and formed with forked ends, substantially as set forth.

7. The auxiliary lever W, with a forked end, pivoted clevis W', claw-hook W², and link W³, substantially as and for the purpose set forth.

In testimony that I claim the above I have hereunto subscribed my name in the presence of two witnesses.

JOHN G. TRUMP.

Witnesses:
E. H. TAYLOR,
GEORGE McKAY.